United States Patent [19]

Roth et al.

[11] 4,063,958

[45] Dec. 20, 1977

[54] HYDROPHOBIC COMPOSITIONS

[75] Inventors: Michael Roth; Erhard Bosch; Herbert Glück, all of Burghausen, Germany

[73] Assignee: Wacker-Chemie GmbH, Munich, Germany

[21] Appl. No.: 701,469

[22] Filed: July 1, 1976

Related U.S. Application Data

[63] Continuation of Ser. No. 487,845, July 11, 1974, abandoned.

[51] Int. Cl.² .................................................. C09C 3/12
[52] U.S. Cl. .............................. 106/308 Q; 106/306; 106/309; 106/300; 427/220
[58] Field of Search .................. 106/308 Q, 309, 306; 427/215, 212, 220

[56] References Cited

U.S. PATENT DOCUMENTS

| | | | |
|---|---|---|---|
| 2,886,460 | 5/1959 | Alexander | 106/308 Q |
| 3,025,179 | 3/1962 | Holbein | 106/308 Q |

FOREIGN PATENT DOCUMENTS

| | | | |
|---|---|---|---|
| 2,012,017 | 10/1970 | Germany | 106/308 Q |

*Primary Examiner*—Winston A. Douglas
*Assistant Examiner*—J. V. Howard

[57] ABSTRACT

The invention relates to hydrophobic compositions and to a method for preparing hydrophobic compositions by mixing an aqueous suspension of finely divided solids containing dissolved salts of metals with an aqueous solution of alkali metal organosiliconates to form substantially water insoluble metal organosiliconates.

3 Claims, No Drawings

HYDROPHOBIC COMPOSITIONS

This is a continuation of application Ser. No. 487,845 filed July 11, 1974, now abandoned.

This invention relates to hydrophobic compositions and more particularly to a method for rendering finely divided particles hydrophobic.

Various methods have been employed to render finely divided particles hyrophobic. For example, in U.S. Pat. No. 2,886,460 to Alexander et al. aqueous solutions of alkali metal organosiliconates have been mixed with an aqueous suspension of finely divided solids at an elevated temperature and at a pH of from about 7.0 to 10.7. In addition, U.S. Pat. No. 3,083,113 to Korf et al. discloses mixing aqueous solutions of alkali metal organosiliconates with an aqueous suspension of finely divided solids at an elevated temperature and thereafter the soluble metal organosiliconates are converted to insoluble compounds with the aid of e.g., zinc sulfate or aluminum sulfate. Finally, German patent Publication No. 20 12 017 (published Oct. 15, 1970) discloses mixing alkali metal organosiliconates with an aqueous suspension of finely divided (pigmentary) titanium dioxide, classifying or sorting the pigment particles and thereafter coating the pigment particles with hydroxides hydrated oxides, phosphates or basic sulfates of, for example, calcium, magnesium or barium.

In contrast to the methods described above, the process of this invention has certain advantages over the prior methods for imparting hydrophobic properties to finely divided solids. For example, the finely divided solids can be coated with a thicker layer of organosilicon compounds, thereby improving the dispersability of the finely divided solids in plastics. When a thicker layer of organosiliconate is deposited on the finely divided solid particles from solutions of alkali metal organosiliconates, the coated particles do not adhere to each other and form undesirable agglomerates. Also, the process can be carried out at room temperature whereas the processes used heretofore utilized elevated temperatures. Also, the finely divided solids were rendered hydrophobic in a single step thereby eliminating the subsequent treatment step described in the prior art.

Therefore, it is an object of this invention to impart hydrophobic properties to finely divided particles. Another object of this invention is to provide finely dispersed hydrophobic particles. Still another object of this invention is to provide coated particles having a thicker layer of organosiliconates. A further object of this invention is to provide a method for treating finely divided particles to render them hydrophobic. A still further object of this invention is to provide a method for rendering finely divided particles hydrophobic at room temperature.

The foregoing objects and others which will be apparent from the following description are accomplished in accordance with this invention, generally speaking, by mixing an aqueous solution of alkali metal organosiliconates with an aqueous suspension of finely divided particles containing dissolved salts of metals which, when combined with the alkali metal organosiliconates, form substantially water insoluble metal organosiliconates.

The terms "finely divided solids" are "finely divided particles" used herein refer to organic and inorganic materials that are solid at 18° C. and at the applicable treatment temperature. Generally these particles are in the form of powders, granules, grains, spheres, ellipsoids or short fibers which do not exceed about 5 mm, and more preferably do not exceed about 2.5 mm. Thus, the particle size can be even 0.001 mm or smaller, as long as a suspension is still present. In order that the finely divided solids can be present in suspension, they must of course be substantially insoluble in water. Thus, no more than one part by weight of the finely divided solids may dissolve in 100 parts by weight of water, preferably 1,000 parts by weight of water at 20° C. However, in order that they can be present in an aqueous suspension, the finely divided solids msut be capable of being wetted with water or a mixture of water and organic solvents miscible with water.

The finely divided solids are preferably inorganic powders of metal oxides or metal carbonates, e.g., titanium dioxide, aluminum oxide, calcium carbonate and/or dolomite. Additional examples of finely divided solids which can be used in the process of this invention are precipitated silicon dioxide, barium sulfate, antimony pentasulfide, clays, ground calcareous sandstone, pumice, perlites, vermiculites, asbestos powder, quartz powder, wood flour, peat, cork powder and granules, coffee grounds and organic pigments such as azo dyes. Mixtures of various finely divided solids can also be employed.

The concentration of the finely divided solids in the aqueous suspensions can of course be the same as in the previously known processes for modifying the surfaces of finely divided solids in which an aqueous suspension of these solids is mixed with an aqueous solution of alkali metal organosiliconates.

The aqueous suspensions of the finely divided solids to be rendered hydrophobic may also contain inert organic solvents that are miscible with water. Alcohols such as methanol, ethanol, n-propanol and isopropanol and ketones such as acetone and methyl ethyl ketone are examples of such solvents. Mixtures of various solvents can be used. In addition to these solids, the aqueous suspensions also contain metal salts which, when combined with alkali metal organosiliconates, form metal organosiliconates that are substantially water insoluble.

The same alkali metal organosiliconates can be used in this invention as were used in the previously known methods for modifying the surfaces of finely divided solids by treating the solids with an aqueous solution of alkali metal organosiliconates. In general, these include monomeric compounds of the general formula

and/or polymeric compounds made up of units of the general formula

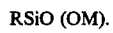

In the above formulae, R represents an aliphatic hydrocarbon group containing one to four carbon atoms and/or a phenyl group with an SiC bond, and M represents an alkali metal. Examples of aliphatic hydrocarbon groups represented by R are alkyl groups having from 1 to 4 carbon atoms such as methyl ethyl, n-propyl isopropyl, n-butyl and sec-butyl groups, as well as alkenyl groups such as the vinyl group. It is preferred that the alkyl group represented by R be a methyl radical. These alkali organosiliconates may be obtained from the distillation residue resulting from the reaction between halogenated hydrocarbons, particularly methyl chloride and silicon. This distillation residue also contains silcarbanes. Thus some of the groups represented by R and/or the siloxane oxygen atoms can be replaced by divalent organic groups, particularly alkylene groups such as methylene, ethylene or propylene groups, connected to an additional Si atom. The alkali metal in the alkali metal organosiliconates can be a Group I metal of the Periodic Table, such as for example, lithium, sodium, potassium, rubidium and/or cesium. Preferably the alkali metal is sodium or potassium. Mixtures of various alkali metal organosiliconates can also be employed in this invention.

The concentration of alkali metal organosiliconates in the aqueous solutions of these siliconates can be the same as used in the previously known processes for modifying the surfaces of finely divided solids. The amount of alkali metal organosiliconate is preferably from about 0.01 to about 30 percent by weight, and more preferably from 0.1 to 10 percent by weight, calculated as $RSiO_{3/2}$ and based on the total weight of the aqeuous solution of alkali metal organosiliconate.

The aqueous solution of alkali metal organosiliconates to be employed in the process of this invention can be the same quantities as were used in the previously known processes for modifying the surfaces of finely divided solids by mixing these solids with an aqueous solution of alkali metal organosiliconates. It is preferred that the concentration of alkali metal organosiliconates be from about 0.01 to 20 percent by weight, and more preferably from 0.05 to 5 percent by weight calculated as $RSiO_{3/2}$ and based on the weight of finely divided solids.

The aqueous solutions of alkali metal organosiliconates can contain not only these siliconates and water and the substances usually accompanying alkali metal organosiliconates, such as alkali hydroxide, but also inert organic solvents which are miscible with water. Examples of such solvents are aliphatic alcohols having up to 4 carbon atoms, such as methanol, ethanol, n-propanol and iso-propanol, as well as ketones such as acetone and methyl ethyl ketone. Mixtures of various solvents can also be employed.

Examples of suitable water soluble salts which may be employed in this invention are halides, especially chlorides of Group II metals of the Periodic Table, such as beryllium, magnesium, calcium, strontium and barium. When these metal salts are combined with alkali metal organosiliconates, metal organosiliconates are formed which are substantially water insoluble. Generally a maximum of about one part by weight of the metal organosiliconates formed from the reaction of the alkali metal organosilic mates with the metal salts dissolves in about 100 parts by weight, and more preferably about one part of the metal organosiliconates dissolves in about 1,000 parts by weight of water at 20° C. However, other water soluble metal salts that do not contain lithium, sodium potassium, rubidium or cesium as their sole cations may also be employed in this invention. However, due to its availability, calcium chloride is the preferred metal salt. Mixtures of various salts of metals which, when combined with alkali metal organosiliconates, form substantially water insoluble metal organosiliconates can be employed in this invention.

The concentration of the metal salts which are dissolved in the aqueous suspension containing the finely divided solids to be rendered hydrophobic is not critical and can range, for example, from 0.01 percent by weight of metal salts based on the weight of water in the suspension up to a saturated solution of such a metal salt.

The metal salts which, when combined with the alkali metal organosiliconates, form metal organosiliconates that are substantially insoluble in water are preferably used in an amount of at least 1 equivalent, and more preferably at least 1.1 equivalent of metal as the metal salts per equivalent of alkali metal in the alkali metal organosiliconates. Amounts of more than two equivalents metal as the metal salts do not offer any additional advantages.

The metal salts may be mixed with water and/or inert organic solvents which are miscible with water prior to or after the preparation of the suspension containing the finely divided solids, but prior to mixing the suspension with the siliconate solution. The finely divided solids especially pigments such as titanium dioxide, frequently occur in the form of aqueous suspensions during their production. When this occurs, the metal salts may be added directly to these suspensions.

The aqueous suspensions of finely divided solids containing dissolved metal salts is preferably mixed with the aqueous alkali metal organosilicate solution while the mixture is being agitated. Even though these liquids can be added in any sequence, it is preferred that the alkali metal organosiliconate solution be added to the suspension.

Although the process of this invention may be carried out at any temperature, it is preferably carried out at room temperature, i.e., at ambient temperature, generally 15° to 25° C., and a ambient pressure, i.e., 760 mm Hg (abs.) or approximately 760 mm Hg (abs.). If desired, however, higher temperatures and/or pressures may also be used.

The process of this invention provides excellent results when carried out at a pH which is common for aqueous solutions of alkali metal organosiliconates, such as at a pH of from 11 to 13. Even though the process is preferably carried out in this pH range, inorganic acids can be added to provide a lower pH range than that specified above.

The hydrophobic finely divided solids can be recovered from the suspensions of this process in any conventional manner known in the art for recovering dry solids from suspensions, e.g., by centrifuging or filtering, washing and drying the solids.

The hydrophobic and thus lipophilic or organophilic, finely divided solids produced in accordance with this invention can be employed wherever materials having the above mentioned properties are required. They are suitable, for example, as fillers for molded objects, or coatings made of thermoplastic resins such as polymers or copolymers of vinyl chloride, vinyl acetate, styrene and/or ethylene, or of natural or synthetic rubber, as components for fire extinguishing powders, as thickeners for liquids, or for eliminating mineral oils and mineral oil products from bodies of water. Molded objects and coatings of polymers and copolymers of ethylene, for example, such as vinyl acetate-ethylene copolymers, which contain hydrophobic titanium dioxide produced in accordance with this invention exhibit a particularly high resistance to chalking when exposed to light and/or water. An increase in the covering power of pigments and an increase in the whiteness of titanium dioxide is achieved with the process of the invention.

Wetting agents such as sodium alkyl sulfonates and/or protective colloids such as polyvinyl alcohol can be applied to the surface of the finely divided solids simultaneously with or subsequently to the process of this invention. For example, the wetting agents and/or protective colloids may be dissolved in the wash water during the working up of suspensions obtained from the process of this invention. The hydrophobic finely divided solids thus formed may be blended into an aqueous media such as aqueous coating materials.

Various embodiments of this invention are further illustrated in the following examples in which all parts and percentages are by weight. In these examples the finely divided solids are treated at a temperature of about 18° C. and at a pressure of about 760 mm Hg (abs.) unless otherwise specified.

EXAMPLE 1 a. Calcium chloride (40 parts) is first dissolved in 400 parts of tap water in which 600 parts of titanium dioxide (manufactured by Titangesellschaft m b H, Leverkusen, Germany, under the designation "RN56") is then suspended. An aqueous solution of potassium methylsiliconate having a siliconate concentration of 10 percent, calculated as $CH_3SiO_{3/2}$, is added within 30 minutes, with agitation to the above suspension. After standing for about 20 minutes, the suspension is centrifuged and the moist cake thus obtained is resuspended in tap water. The suspension thus obtained is again centrifuged and the solid product thus obtained is dried at 110° C.

b. This product can be pulverized in a mortar just as easily as untreated titanium dioxide that has merely been suspended in tap water, centrifuged and dried at 110° C. This demonstrates that no undesirable agglomeration or caking of particles has occurred in the process of this invention. The untreated titanium dioxide is wetted well by water, while the titanium dioxide treated in accordance with this invention is hydrophobic.

EXAMPLE 2

The procedure described in Example 1(a) is repeated except that 80 parts of calcium chloride is used instead of 40 parts of calcium chloride and 96 parts of the aqueous solution of potassium methyl siliconate is used instead of 48 parts of the aqueous solution of potassium methylsiliconate.

The properties of the product thus obtained are the same as those described in Example 1(b).

EXAMPLE 3

The procedure described in Example 1(a) is repeated except that 600 parts of finely divided calcium carbonate (obtainable from the firm of Omya Mahlwerk G.m.b.H., Cologne, under the name "Durcal 5." "Durcal" is a registered trademark) are substituted. for the titanium dioxide.

The properties of the product thus obtained are the same as those described in Example 1(b).

EXAMPLE 4

The procedure described in Example 2 is repeated except that 600 parts of finely divided calcium carbonate (same as that used in Example 3) are substituted for the titanium dioxide.

The properties of the product thus obtained are the same as those described in Example 1(b).

EXAMPLE 5

The procedure described in Example 1(a) is repeated except that 600 parts of dolomite powder (obtained from the firm of C.H. Erbsloh, Dusseldorf, under the name "Microdol 1." The name "Microdol" is a registered trademark) are substituted for the titanium dioxide.

The properties of the product thus obtained are the same as those described in Example 1(b).

EXAMPLE 6

The procedure described in Example 2 is repeated except that 600 parts of dolomite powder of the origin indicated in Example 5 are substituted for the titanium dioxide.

The properties of the product thus obtained are the same as those described in Example 1(b).

EXAMPLE 7

Calcium chloride in quantities of (a) 0.9 part, (b) 1.8 parts and (c) 5.0 parts are each dissolved in 30 parts of tap water and to each of these solutions is added 30 parts of titanium dioxide (rutile) to form a suspension. Within 30 minutes, (a) 0.6 part, (b) 1.2 parts and (c) 5.0 parts, respectively, of an aqueous solution of potassium n-propylsiliconate having a siliconate concentration of 20 percent, calculated as $C_3H_7SiO_{3/2}$, are added to each of the suspensions. About 4.1 parts of aqueous HCl are added with stirring, to each suspension to maintain the pH below 7.5. The suspensions are agitated for 60 minutes and then centrifuged. The moist cake product obtained after centrifuging is suspended in water and then centrifuged. The moist cake thus obtained is resuspended in water and again centrifuged. The cake ultimately obtained is dried in a recirculating air oven at 70° C.

Emulsion paints having the following composition are prepared using the different types of titanium dioxide pigments described above. These compositions are compared with untreated titanium dioxide which has been suspended in water and centrifuged. The step of suspending and centrifuging the titanium dioxide is again repeated and the cake ultimately obtained being dried in a recirculating air oven at 70° C.

17.70 parts water
1.50 parts 10 percent aqueous solution of commerical polymeric sodium metaphosphate (manufactured by Joh. A. Benckiser G.m.b.H., Ludwigshafen, under the name "Calgon N," registered trademark)
2.50 parts commercial 10 percent hectorite paste
18.00 parts titanium dioxide pigment
20.00 parts commercial dolomite powder ("Microdol 1"; Example 5)
2.00 parts commercial talc (manufactured by C. H. Erbsloh, Dusseldorf, under the name "Talkum AT 1")
0.20 part commercial defoaming agent (obtained from Nopco Chemical Company, Newark, N.J., under the name "Nopco NDW")
2.00 parts ethylene glycol
3.50 parts 3 percent aqueous solution of commercial methylcellulose (obtained from the firm of Kalle AG, Wiesbaden-Biebrich, under the name "Tylose MH 4000-K," registered trademark)
32.00 parts commercial 50 percent aqueous dispersion of a copolymer of vinyl acetate and ethylene in which approximately 18 percent of the units are derived from ethylene (obtained from the firm of Wacker-Chemie GMBH, Munich, under the name "Vinnapas Dispersion EP1," registered trademark)
0.03 part aqueous ammonia Paint films with a thickness of 0.2 mm are prepared from the emulsion paint by pouring it on aluminum sheets and allowing it to dry at room temperature. The paints are then subjected to irradiation with an ultraviolet lamp (836 watt) at a distance of 35 cm. Portions of the films are covered during the process and thus protected from additional irradiation after various irradiation times of 0, 40, 50, 60, 70, 80, 90, 100, 110, 120, 140 and 160 hours. Upon the termination of irradiation, the films are tested, making use of the draft specification DIN (German Industrial Standard) 53,223, July 1972, "Determination of the Degree of Chalking of Paints by the Adhesive Tape Method." In this test, a commerical pressure-sensitive adhesive strip (obtained from Beiersdorf A.G., Hamburg, under the name "Tesafilm." "Tesa" is a registered trademark) is pressed against the films which have been irradiated, then slowly removed at a constant rate and pressed against black photographic paper. The pigments removed from each paint sample by the adhesive strip are thereby made visible. The results of this test are illustrated in Table 1.

TABLE 1

| Titanium dioxide | Onset of chalking (hours) | Onset of severe chalking (hours) |
| --- | --- | --- |
| Untreated | 40 | 90 |
| (a) | 50 | 120 |
| (b) | 100 | * |
| (c) | 120 | * |

* After 160 hours, chalking is still not as severe as after 70 hours in the case of untreated titanium dioxide.

In addition, the emulsion paints are tested in accordance with the TAKD (Technical Study Group and Emulsion Paints) specification "Requirements and Test Method(s) for Paints for Walls and Ceilings" for brightness (paragraph 3.4) and hiding power (Paragraph 3.5). The results of this test are illustrated in Table 2.

TABLE 2

| Titanium dioxide | Brightness | Hiding power, $g/m^2$ for 98 percent |
| --- | --- | --- |
| Untreated | 90.5 | 143 |
| (a) | 90.8 | 139 |
| (b) | 90.9 | 135 |
| (c) | 90.9 | 134 |

Although specific examples of the invention have been herein described, it is not intended to limit the invention solely thereto, but to include all the variations and modifications falling within the spirit and scope of the appended claims.

What is claimed is:

1. A method for treating finely divided solids to impart hydrophobic properties thereto which comprises coating said finely divided solids with a substantially water insoluble metal organosiliconate by contacting an aqueous solution of finely divided solids containing a dissolved metal salt selected from the class consisting of beryllium, magnesium, calcium, strontium and barium with an aqueous solution of an alkali metal organosiliconate in which 1.0 to 2 equivalents of metal are present per equivalent of alkali metal in the alkali metal organosiliconate to form a coating thereon and thereafter separating the coated finely divided solids from the aqueous medium.

2. The process of claim 1 wherein the metal salt is calcium chloride.

3. The coated finely divided solids which are obtained from the process of claim 1.

* * * * *

UNITED STATES PATENT AND TRADEMARK OFFICE
CERTIFICATE OF CORRECTION

PATENT NO. : 4,063,958
DATED : December 20, 1977
INVENTOR(S) : Michael Roth, Erhard Bosch and Hubert Gluck It is certified that error appears in the above-identified patent and that said Letters Patent are hereby corrected as shown below:

On the Title and Abstract page insert:

[30] Foreign Application Priority Data
July 17, 1973   Germany        P 23 36 368.0

Signed and Sealed this

Ninth Day of May 1978

[SEAL]

Attest:

RUTH C. MASON
Attesting Officer

LUTRELLE F. PARKER
Acting Commissioner of Patents and Trademarks